April 25, 1950  W. G. HOELSCHER  2,505,737
LUBRICATION OF THE WAYS AND APRONS OF LATHES
Filed June 7, 1944  5 Sheets-Sheet 1

INVENTOR.
William G. Hoelscher
BY Wood, Arey, Herron & Evans
Attorneys

April 25, 1950 W. G. HOELSCHER 2,505,737
LUBRICATION OF THE WAYS AND APRONS OF LATHES
Filed June 7, 1944 5 Sheets-Sheet 2

INVENTOR.
William G. Hoelscher
BY
Wood, Arey, Herron & Evans
Attorneys.

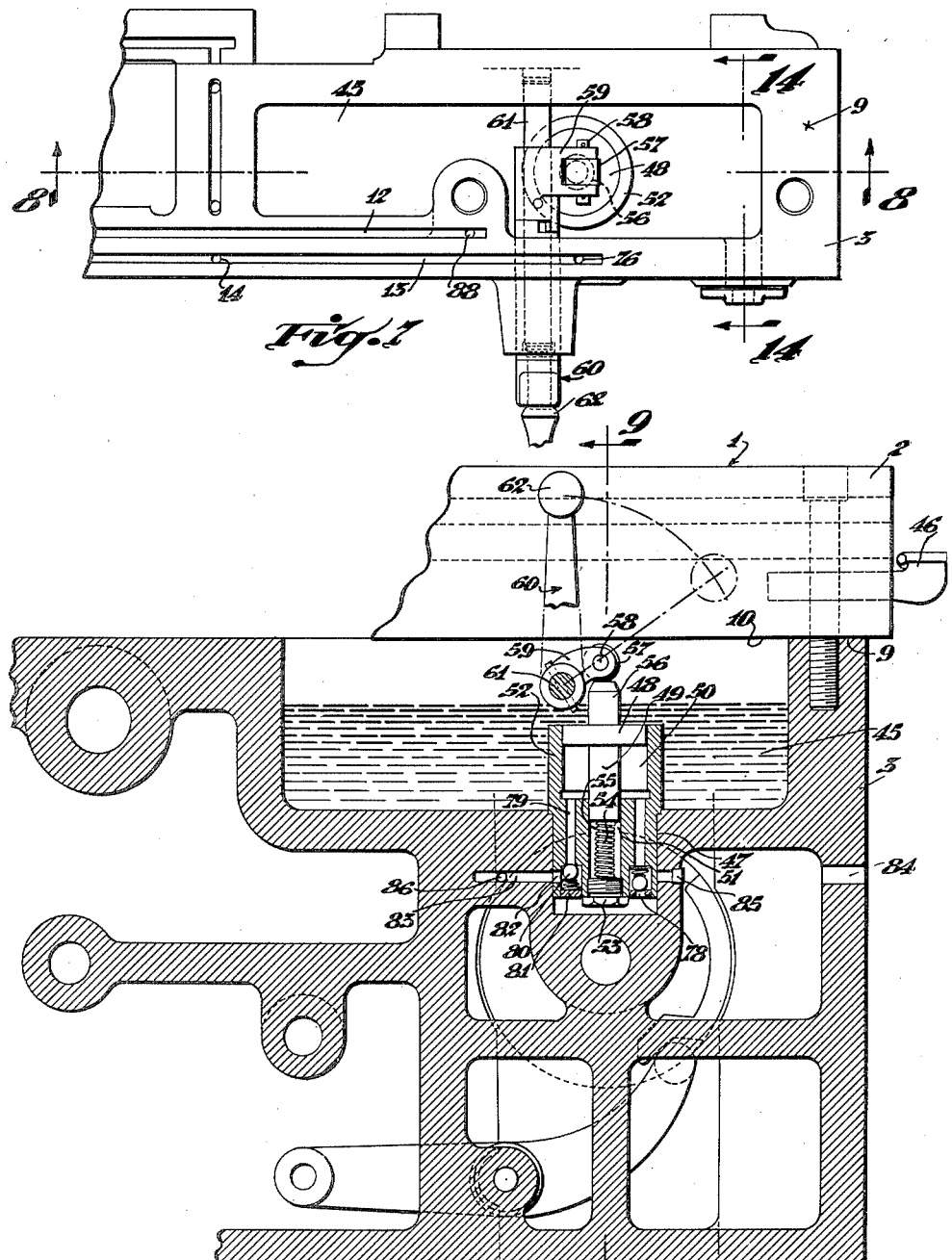

April 25, 1950 W. G. HOELSCHER 2,505,737
LUBRICATION OF THE WAYS AND APRONS OF LATHES
Filed June 7, 1944 5 Sheets-Sheet 4

INVENTOR.
William G. Hoelscher
BY
Wood, Arey, Herron & Evans
Attorneys

April 25, 1950 W. G. HOELSCHER 2,505,737
LUBRICATION OF THE WAYS AND APRONS OF LATHES
Filed June 7, 1944 5 Sheets-Sheet 5

INVENTOR.
William G. Hoelscher
BY
Wood, Arey, Herron & Evans
Attorneys.

Patented Apr. 25, 1950

2,505,737

UNITED STATES PATENT OFFICE 2,505,737

LUBRICATION OF THE WAYS AND APRONS OF LATHES

William G. Hoelscher, Cincinnati, Ohio, assignor to The American Tool Works Company, Cincinnati, Ohio, a corporation of Ohio Application June 7, 1944, Serial No. 539,208

7 Claims. (Cl. 184—6)

This invention relates to lubrication of machine tools and it is directed particularly to the lubrication of the ways, the feed gearing, and associated elements in the carriage of a lathe.

The principal purpose of the invention has been to provide a lubrication system for maintaining copious supplies of lubricant at the ways and gearing elements without actual flooding, and to provide a pressure lubricating system which may be activated when the need for lubricant exists. Thus, in general, the invention contemplates a system of ducts or passageways and means for supplying lubricant under pressure to the passageways as from a pump.

Systems of this general type have been proposed in the past but have not been fully satisfactory for the reason that the lubrication requirements of the ways are substantially different from the lubrication requirements of the apron gearing and feed elements. In the former, substantial areas of contact between the carriage and the lathe ways must be lubricated with a substantial volume of oil. On the other hand, only small quantities of oil are required for lubrication of the feed gearing bearings but the supply must be maintained positively since the shafts at many of the bearings operate continuously. Supplying oil in quantities sufficient for lubrication of the ways floods the apron mechanism and an undesirable dripping and discharge of oil results. On the other hand, if the supply is limited to avoid this result then the ways suffer from inadequate lubrication.

The present invention, briefly, is predicated upon the concept of providing pressure lubrication for the ways and for the apron mechanism from a common source which may be operated through a single lever, and in differentiating between the quantities of lubricant supplied to the ways and to the apron mechanism according to their actual requirements. To accomplish this purpose the present invention contemplates a pair of positive displacement pumps which are arranged for operation in unison through an actuating lever located in an accessible position upon the apron. One of the pumps of the pair is of relatively small volume and it directs lubricant to the apron mechanism while the other delivers oil in substantial quantity to the carriage for lubrication of the ways. In this manner both the feed gearing and the ways receive fully adequate supplies of lubricant, and neither suffers nor is overcharged; the ways beyond the carriage do not become flooded and there is no needless dripping and wastage of oil from the apron.

The invention further contemplates a lathe carriage structure in which two individual distribution systems, one for the ways and the other for the apron, are provided through a channelway system, the major portion of which is devoid of tubing or the like and is constituted by communicating grooves and holes cut directly into the mating faces to be lubricated.

A further feature of the invention contemplates a balanced pressure and volume system for the ways and apron having an orifice at a point which is remote from the point of supply such that the charging of lubricant is continued until it spurts from the orifice to indicate that the entire system is filled.

The invention, among other features which are described in the specification which follows, also contemplates the provision of oiling for the cross feed nut at the time the other elements are oiled.

From the foregoing discussion of the principles upon which the invention is based and the following detailed description of the drawings in which a preferred embodiment of the invention is disclosed those skilled in the art will comprehend the various modifications to which the invention is susceptible.

In the drawings:

Figure 7 is a plan view looking down upon the apron from which the saddle of the carriage assembly has been removed.

Figure 8 is a fragmentary sectional elevation showing the details of the pump assembly from which lubricant is forced to the high and low volume systems respectively.

Figure 1:
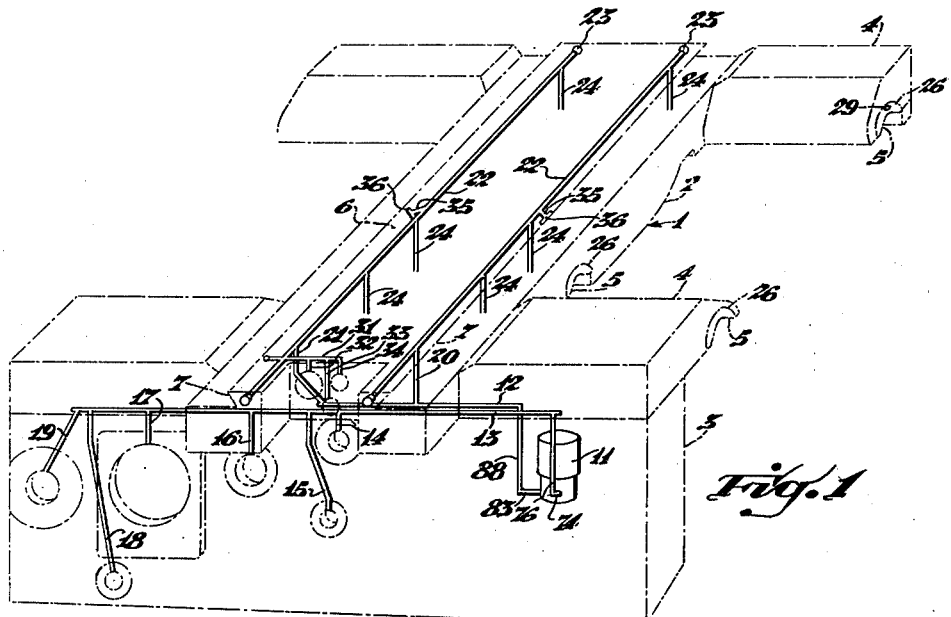
Figure 1 is a schematic perspective view showing the entire system, comprising the low volume system for lubrication of elements contained within the apron and the high volume system for the carriage ways.
Figure 2:
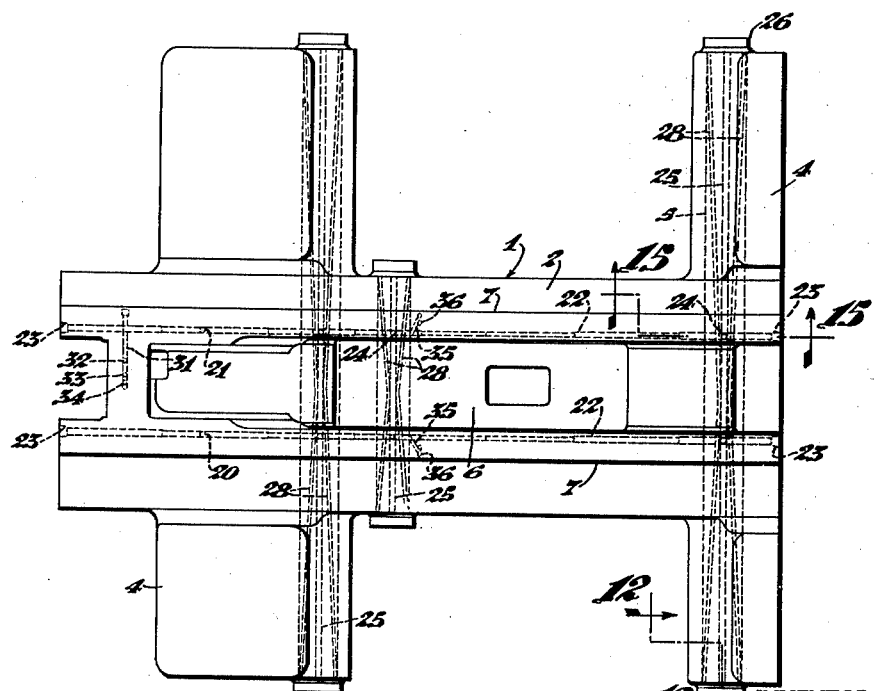
Figure 2 is a plan view looking down upon the carriage; the cross slide and compound rest have been omitted.
Figure 3:
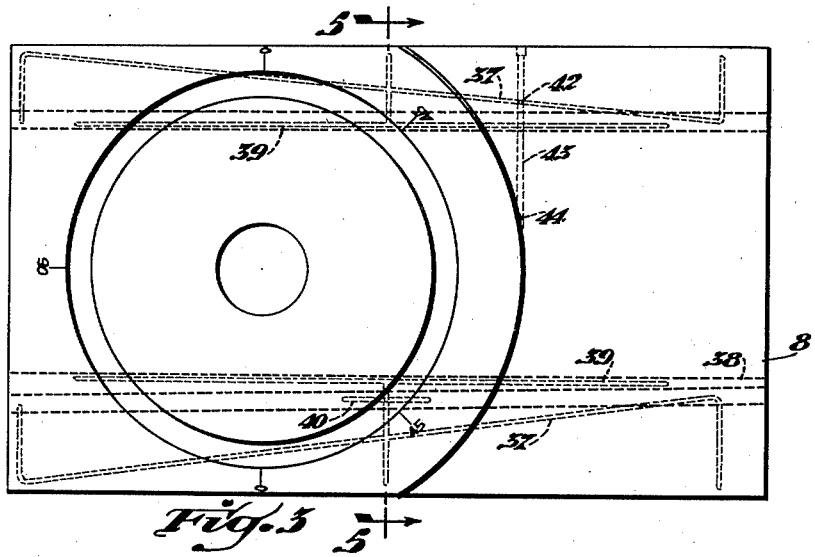
Figure 3 is a plan view of the cross slide.
Figure 4:
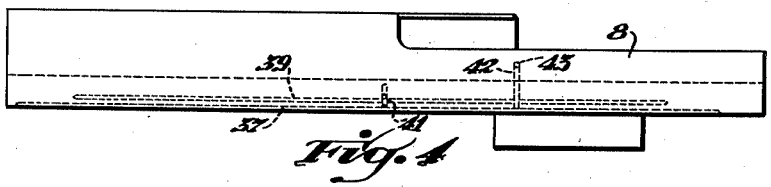
Figure 4 is a side elevation of the cross slide.
Figure 5:
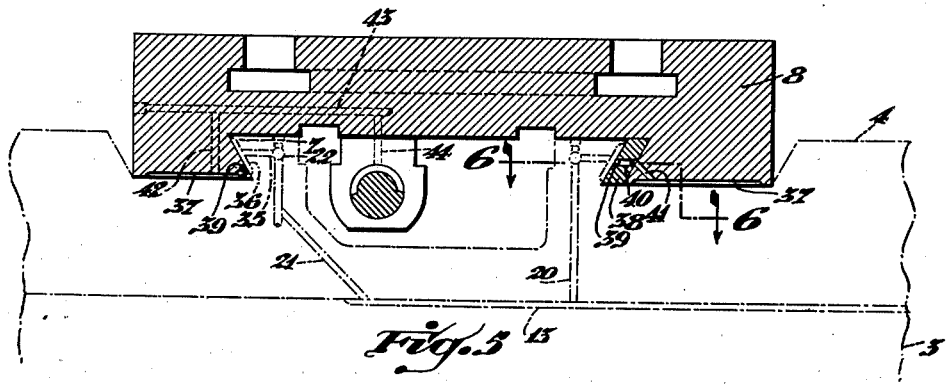
Figure 5 is a cross sectional view taken on the line 5—5 of Figure 3.
Figure 6:
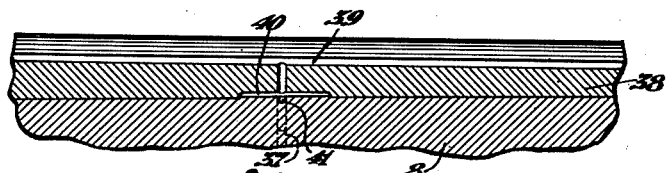
Figure 6 is a horizontal section taken on the line 6—6 of Figure 5.

The carriage of the lathe is indicated generally at 1 in the drawings and comprises a saddle 2 from which an apron 3 depends at the front end. The saddle, excepting for the oiling system hereof, is of conventional construction comprising longitudinal members 4—4 which have V grooves 5 at their underneath faces, to ride the lathe ways, and a cross piece 6 having dovetail grooves 7 adjacent its opposite edges to provide the slideway for the cross slide of the lathe. In the drawings, the cross slide block 8 is shown in Figures 3 to 6 but is omitted from the other views to simplify the illustration of the present improvement. The upper edge 9 of the apron 3 and the lower surface 10 of the forward portion of the saddle form a substantially oil-tight joint with one another and the usual bolts or fastening means are employed to fasten the apron to the saddle.

Two lubricant distribution systems are embodied in the carriage apparatus, one fed with a substantial volume of lubricant for the ways, and the other fed with a relatively lesser quantity of lubricant for oiling of the mechanism carried by the apron. Both systems are supplied, in unison, from a common pump which in Figure 1 is indicated generally at 11. The construction of the pump is described in detail at a later point in the specification. This apparatus is located at the inner face of the apron.

The main arteries of both distribution systems comprise conduits 12 and 13 (Figures 1 and 7) which are constituted by grooves cut into the upper surface 9 of the apron 3, or cut into the lower surface 10 of the saddle, or by mating grooves cut in each of these meeting faces. Arteries 12 and 13 are fed respectively from the high volume and low volume outlets of the pump 11.

The low volume or apron oiling system includes a series of conduits which branch from the artery 13 to the various apron journals at which lubrication is required. In the preferred embodiment of the invention these branch conduits, indicated generally at 14, 15, 16, 17, 18 and 19 are constituted by bores which pass from the artery 13 through the metal of the apron to the respective journal bores. Thus, a short hole substantially vertical in direction passes from the artery 13 at the top of the apron down to the cross feed clutch shaft. Conduit 15 terminates at a bore wherein the feed bevel gear shaft is journalled. Conduit 16 feeds the longitudinal feed friction shaft and conduit 17 furnishes lubricant to the rack pinion bearing. Conduit 18 is led to the bearing for the traverse bevel gear and the passage 19 supplies lubricant to the bearing of the hand traverse hand wheel. These elements conventionally are included in the apron mechanism of a lathe but it will be understood that conduits, branching from the main artery 13, may be taken to various other portions of the apron apparatus as desirable. It also will be noted that some of the conduits may, for clearance purposes, depart from a straight line. In such event oil tubing communicating with the artery 13 may be employed or holes meeting one another may suitably be drilled and the unwanted outlets plugged.

In this distribution system each of the branch conduits fed under pressure from the main supply furnishes lubricant by gravity to its bearing when the pressure is relaxed. Thus during operation of the pump oil is forced into the various bearings and thereafter the branch conduits stand full of oil which feeds downwardly to the various bearings by gravity. This gravity feed is insufficient in and of itself to lubricate the bearings but it does serve the purpose of safeguarding any of the bearings from becoming completely dry.

The high volume lubricating system for the lathe ways, the cross slide and related elements are fed from artery 12 which extends longitudinally of the apron from the point of supply into communication with two risers 20 and 21. These pass upwardly into communication with conduits 22—22 which respectively extend longitudinally of the cross member 6 adjacent the dovetail grooves 7. The conduits 22—22 preferably comprise holes drilled lengthwise in the saddle, the ends of the holes being plugged as at 23.

The V grooves 5 of the carriage, fitting the ways of the lathe, have elongated slots 25 extending upwardly therefrom so as to clear the upper portions of the lathe ways and thereby provide oil reservoirs which extend through the length of each V groove. The endwise portions of the slots 25 are blocked by shear wipers 26 except as hereinafter described. Lubricant is fed into the slots or oil grooves 25 from conduits 24. Thus, as shown in Figure 1, there are six such conduits, two for the front way, two for the middle way and two for the rear way, all depending respectively from the feeders 22 at the opposite sides of the saddle. At the juncture of the conduits 24 and grooves 25 recesses 27 are cut into the walls of the V grooves 5 to carry lubricant downwardly from grooves 25 whereby it may flow into the distributing channels 28.

Figure 12:
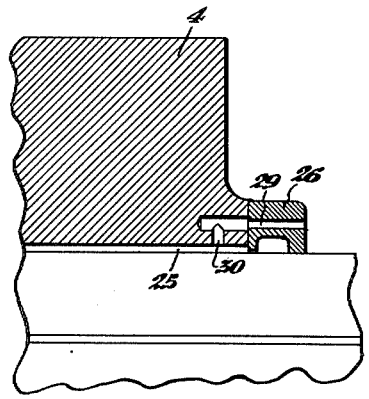
Figure 12 is a sectional elevation showing details of a shear wiper for the ways having an orifice therein from which oil can spurt to denote a filled system.
Figure 13:
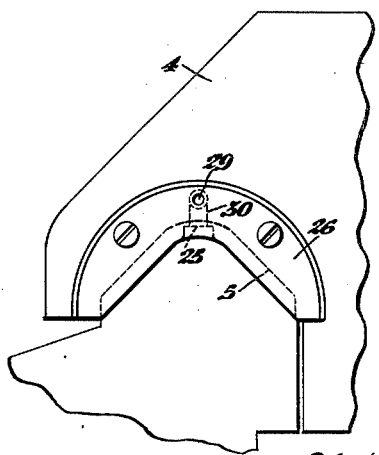
Figure 13 is an elevation of a typical shear wiper carried by the saddle.
Figure 14:
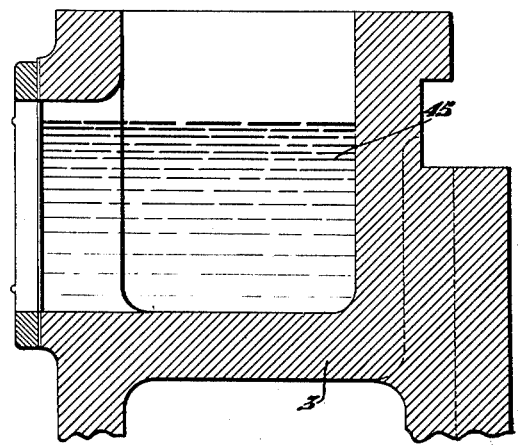
Figure 14 is a sectional elevation through the apron showing the oil reservoir and sight glass.
Figure 15:
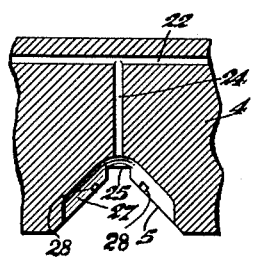
Figure 15 is a sectional elevation taken on the line 15—15 of Figure 2 to illustrate a portion of the distribution system at the ways.
Figure 16:
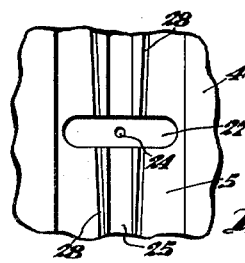
Figure 16 is a view looking upwardly at the bottom of the carriage area illustrated in Figure 15 in cross section.

The shear wipers 26 in the preferred embodiment of this invention are hardened metal pieces fastened suitably to the ends of the carriage and preferably lapped to fit the lathe ways very closely. These wipers constitute obstructions which prevent undue escape of oil from the ends of the carriage onto the lathe bed and prevent the entrance of dirt and grit beneath the carriage. According to the present invention, however, one of the shear wipers, preferably one which is remote from the pump 11, has an orifice in it through which oil under pressure may spurt to indicate to the operator that the entire lubrication system is filled. This orifice 29, as shown in Figures 12 and 13, is located at a level above the groove 25 but the orifice communicates with the groove through a passageway 30. When the system is filled but not under pressure all wipers block the escape of oil. When pressure is applied the oil rises through the passageway 29 and spurts through the opening 30.

One of the feeders 22 also supplies lubricant to the cross feed screw bearing and related shafts and pinions through a branch line 31 which extends laterally of the cross member 6 to feed conduits 32, 33 and 34. The first of these conduits leads directly to the front bearing for the cross feed screw, the second to the bearing for the cross feed idler pinion, and the third to the power angular feed shaft.

For the lubrication of the cross slide block which moves longitudinally of the member 6 along the dovetail 7 branch conduits 35—35 project outwardly from the feeders 22 to the dovetail surfaces 7. At these surfaces grooves 36 are cut into the dovetail surfaces, the grooves, however, terminating downwardly from the upper edges thereof. The lower faces of the cross slide which bear upon the saddle both have distribution channels 37 cut in them which may be of the usual S or Z configuration. Oil passes from the grooves 36 to the distribution channels 37 through a system of interconnecting passages, one of which is somewhat different from the other to accommodate the gib 38. Thus, at the one side of the cross slide block (e. g. the left hand side) there is a groove 39 extending longitudinally of the block and terminating inwardly of its ends. This groove communicates with the slot 36 and serves as a means for maintaining an open passageway to the distribution channel 37 when the cross slide is operated back and forth of the carriage. At the other side of the cross slide block the interference caused by the gib is avoided by the provision of a passageway 40 on the outer face of the gib. This passageway is elongated sufficiently to permit some longitudinal movement of the gib (for wear take-up) without disrupting communication of the passage 36 with the distribution channel 37. A groove 39, similar to the groove 39 on the left-hand side of the cross feed slide, is provided on the inner face of the gib, adapted to communicate with the passageway 40 on its outer face. The oil then passes from the passageway 40 through a conduit 41 to the distribution channel 37. Both bearing faces of the cross slide therefore are fed with oil through a system of passageways all of which are in communication with one another regardless of the movement of the cross slide.

The cross feed nut is also lubricated from this system through a conduit 42 which extends upwardly from one of the distribution channels 37 into connection with a bore 43 that extends laterally of the cross slide to feed a conduit 44 extending therefrom to the nut itself.

The apron 3 of the lathe, as shown in Figures 7 to 11, has a reservoir 45 built into it, preferably at a position just beneath the saddle; this reservoir is formed integrally in the apron casting and oil is introduced into it through a filler 46. The bottom of the reservoir has a well cavity 47 bored therein which receives the pump assembly 11. The pump is of the positive displacement type embodying two pistons 48 and 49 mounted on a common shaft and operable in unison with one another. These pistons operate respectively in bores 50 and 51 of a pump body 52. Piston 48 is substantially greater in diameter than piston 49 and, inasmuch as both have the same stroke, the former delivers a volume of lubricant which is substantially larger than the latter.

The lower portion of the bore 51 is threaded to receive a cap 53 and a stud 54 extends upwardly from the cap within a recess extending longitudinally of the piston 49. Compression spring 55 surrounds the stud 54 with its one end resting on the cap while the other end abuts the piston 49 within the recess thereof, to bias both pistons in an upward direction.

A stud 56 extends upwardly from the piston 48 and is engaged by a roller 57 rotatably carried on a shaft 58 which extends between the arms 59 of a bell crank 60. This crank is pinned to a shaft 61 which has its rear end journalled in one wall of the reservoir while the other end passes through the front wall of the apron 3 to carry a hand operating lever 62.

Figure 9:
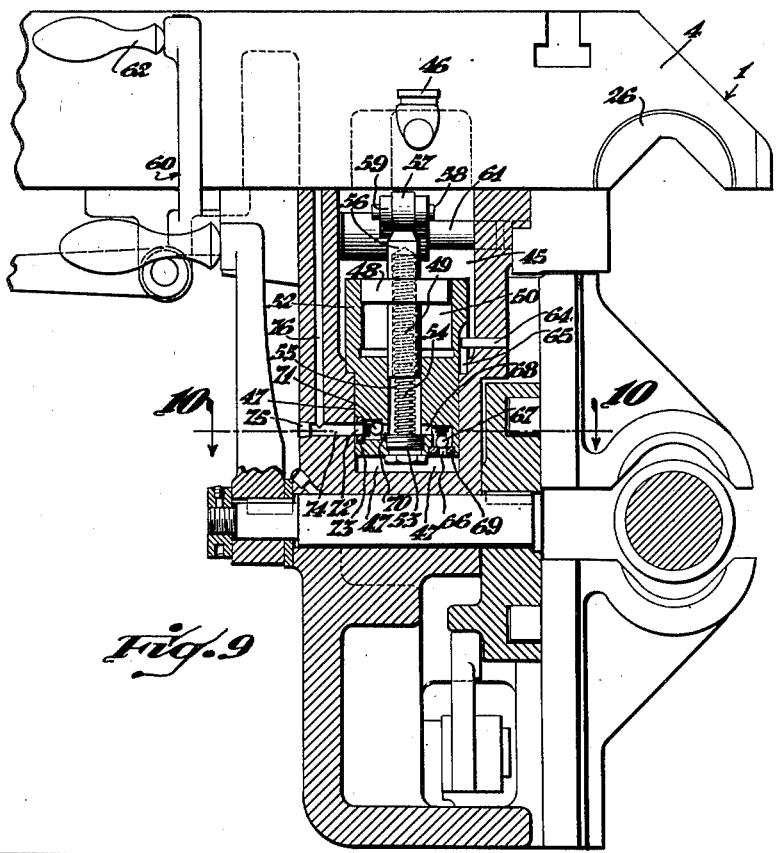
Figure 9 is a sectional elevation taken on the line 9—9 of Figure 8.
Figure 10:
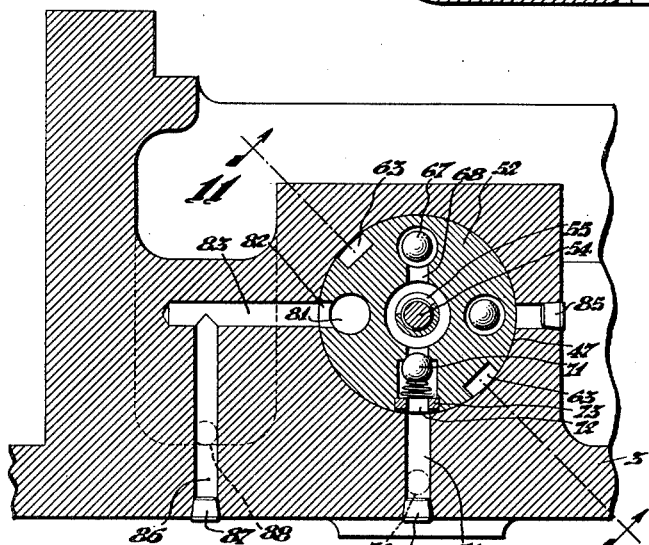
Figure 10 is a horizontal sectional view taken on the line 10—10 of Figure 9.
Figure 11:
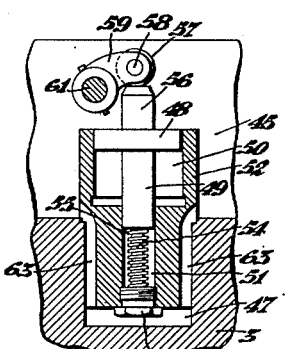
Figure 11 is a fragmentary view taken on the line 11—11 of Figure 10.

The pump body 52 preferably is circular is contour and it fits relatively snugly with a shoulder of the pump body resting upon the bottom of the reservoir. The well 47 however is greater in depth than the distance which the pump extends into it and the lower portion of the well is employed as a sump into which oil flows from the reservoir and from which oil is drawn into the pump. This arrangement is utilized as a means of obtaining compactness in the structure which is very desirable because of the relatively crowded conditions within the apron. The inlet and outlet valves for the high volume and low volume pumps all are located adjacent the bottom of the sump and the sump itself is supplied with lubricant from the reservoir through grooves 63 cut into the body of the pump housing from the lower extremity thereof to a point above the bottom of the reservoir. These grooves and the valves of each pair preferably are arranged diametrically opposite one another in spaced radial relationship. Thus in the structure shown in the drawings the valves for the low volume pump are located on a line extending laterally of the apron as shown in Figure 9. The valves for the high volume pump are arranged on a line extending longitudinally of the apron as shown in Figure 8 and the sump inlet grooves 63 are located on an axis residing intermediate the longitudinal and lateral axes. This arrangement, of course, is not essential but it provides adequate wall thickness without cramping of the parts. The pump assembly is held against rotation in the well by means of a pin 64 which engages a keyway 65.

Fluid for the low volume pump passes from the sump 47 through an opening 66 (Figure 9) past a ball check member 67 and through an opening 68 into the cylinder 51, the ball 67 being arranged to seat upon a retainer ring 69 which contains the inlet orifice 66 and which is threaded into the lower end of the pump body. At the outlet valve a similar construction is utilized to provide for flow of oil through an orifice 70 past a ball check valve 71 and through an orifice 72 in a retainer ring 73 to a conduit 74. This conduit is a hole drilled through the apron wall and plugged at its outer end at 75. A vertical conduit 76 interconnects this passage with the artery 13.

The inlet, outlet and valve system for the high volume pump is shown best in Figure 8. The valves are of similar construction and function, and the description thereof therefore is not repeated. It is to be noted, however, that in this case the valve body contains an inlet opening 78 which extends from the lower extremity thereof, where the inlet valve is located, upwardly through the body into communication with the upper cylinder 50; likewise an outlet passageway 79, oppositely arranged, extends downwardly from the upper cylinder 50 to an outlet valve 80 which is seated upon a retaining member 81. Lubricant from this high volume pump passes through a lateral passageway 82 into a bore 83 which is drilled into the apron casting through the clearance hole 84. (The drill hole at the side of the pump opposite the outlet is plugged as at 85.) Passageway 83 communicates with a passageway 86 drilled into the apron from the front thereof and plugged as at 87, and a hole 88 passes downwardly from the artery 12 through the apron into communication with the passageway 86.

The operation of the lever 62 causes rotation of the shaft 61 moving the roller 58 downwardly to depress both pistons simultaneously. Oil trapped within the cylinders in which these pistons operate is forced therefrom through the valve outlets just described and into the respective distribution systems. When the lever is returned under the influence of the spring 55 the outlet valves close, the inlet valves open and lubricant simultaneously is drawn from the well 47 into the high and low volume cylinders to recharge them for the next successive operation of the lever.

In the use of the apparatus the operator continues to actuate the lever until oil spurts from the orifice 29 in member 26 which is at a remote point of the system. This denotes that all passageways are completely filled.

Having described my invention, I claim:

1. In a lathe carriage having a reservoir and having grooves for engagement with the ways of a lathe bed and feed mechanism for effecting traverse of said carriage upon said bed, a pair of single acting reciprocating pumps connected in tandem, means for delivering lubricant contained within said reservoir to said pumps respectively, one of said pumps being constructed to deliver a substantially greater volume of liquid than the other, means for actuating said pumps in unison, conduit means for delivering the discharge from the pump of greater capacity to the ways of said carriage, and conduit means for delivering the discharge from the pump of lesser capacity to said mechanism.

2. A lathe carriage having a reservoir therein and having ways thereon for engagement with the bed of a lathe, a pump communicating with said reservoir, a distribution system connecting the outlet of said pump with said ways, means at the extremities of said ways for blocking the escape of fluid lubricant therefrom with one of said blocking means having an outlet orifice therein at a point higher than the rest of said distribution system, through which oil may spurt under the pressure of said pump to denote complete filling of said distribution system.

3. In a lathe carriage having a reservoir therein, means forming a sump at the bottom of said reservoir, a pump housing located within said sump and terminating above the lowermost level thereof, means forming conduits for delivery of lubricant from said reservoir to said sump, said pump housing having bores therein forming cylinders arranged in tandem on a common axis, cylinders slidable respectively within said bores and interconnected in tandem, respective inlet and outlet valves for said cylinders located adjacent the lower portion of said pump housing, means biasing said pump pistons in one direction, a lever for moving said pump pistons in unison against said biasing means, and individual distribution conduit systems extending from the outlets of said cylinders respectively to the carriage ways and to the carriage mechanism.

4. In a machine tool, a movable member having a reservoir therein, a sump extending beneath the bottom of said reservoir, a pump body generally of cylindrical contour extending into said sump and terminating above the lowermost level thereof, said body having at least one opening adjacent its periphery constituting a passageway through which lubricant may flow from the reservoir to the sump, said pump body having bores therein respectively of different diameters arranged in tandem on a common axis, pistons connected in tandem for operating respectively within said bores, means including inlet and outlet valves extending to and from said bores respectively, individual distribution systems for receiving the discharges from said pumps, and means for actuating said pistons in unison.

5. A movable member of a machine tool having surfaces arranged for engagement with stationary ways of said machine tool, said movable member having grooves in said surfaces and channels communicating with said grooves and extending into said movable member beyond said grooves, wipers mounted on said movable member and adapted for mating engagement with the ways of said stationary member for blocking escape of oil in the endwise portions of said grooves, said movable member having a reservoir therein, a pump, conduit means extending from said reservoir to the pump and from the pump to said channels for delivery of oil under pressure from the pump to said grooves, one of said wipers having an outlet orifice therein located above the upper level of said channel but in communication therewith whereby oil introduced into said channel from the pump first fills the channel, then the grooves and subsequently permits oil to discharge therefrom to denote a filled condition of the channels and conduits.

6. In a lathe carriage having an apron including journals requiring lubricant and also having ways requiring lubricant, a lubricant reservoir, a pump housing having a pair of bores therein which are in valved communication with said reservoir, pistons arranged within said cylinders, means for operating said pistons in unison including a lever mounted on said apron, conduit means interconnecting the discharge from one of said cylinders with said carriage ways, and conduit means interconnecting the discharge from the other of said cylinders with said apron gearing, with one of said carriage ways having a discharge orifice therefrom which is at a level relatively higher than the highest point in the conduit system connected therewith, through which orifice lubricant may be discharged to denote a filled condition of the conduit means extending thereto.

7. Lubrication apparatus for a movable member of a machine tool having a reservoir thereon including a pump body having a pair of bores arranged in tandem on a common axis with respect to one another, the said bores being of different diameter, pistons connected in tandem slidable within said bores, means supported by said movable member for operating said pistons in unison, conduit means for delivering lubricant from said reservoir to said bores for expulsion therefrom by said pistons respectively and separate distribution conduit systems respectively connected to receive discharges from said bores, the system connected with the bore of larger diameter terminating at working surfaces of said movable member which require a copious supply of lubricant and the other distribution system terminating at working surfaces requiring a relatively lesser supply of lubricant.

WILLIAM G. HOELSCHER.

REFERENCES CITED

The following references are of record in the file of this patent:

UNITED STATES PATENTS

| Number | Name | Date |
| --- | --- | --- |
| 1,476,949 | Cardullo | Dec. 11, 1923 |
| 1,562,664 | Tedrick | Nov. 24, 1925 |
| 1,625,618 | Manzel | Apr. 19, 1927 |
| 1,781,149 | Zimmermann | Nov. 11, 1930 |
| 2,044,957 | Strebler | June 23, 1936 |
| 2,190,858 | Bennett | Feb. 20, 1940 |
| 2,229,095 | Kacher | Jan. 21, 1941 |